United States Patent
Castleman et al.

[11] Patent Number: 6,131,946
[45] Date of Patent: Oct. 17, 2000

[54] STEERING WHEEL

[75] Inventors: William N. Castleman, Wyandotte; Michael J. Olesko, Ann Arbor; Brian C. Parker, Sterling Hgts.; Peter L. Vigeant, Canton; Darrell A. Kellogg, Jr., Belleville; Norinari Nagata, West Bloomfield, all of Mich.

[73] Assignee: Toyoda Gosei Co., Ltd., Aichi-ken, Japan

[21] Appl. No.: 09/107,508

[22] Filed: Jun. 30, 1998

[51] Int. Cl.[7] .............................. B60R 21/16; H01R 39/00
[52] U.S. Cl. ........................ 280/731; 280/728.2; 439/164; 439/15
[58] Field of Search .............................. 280/728.2, 728.1, 280/731; 439/164, 15; 200/61.54; 74/552

[56] References Cited

U.S. PATENT DOCUMENTS

| | | | |
|---|---|---|---|
| 4,393,280 | 7/1983 | Iwata et al. | 200/61.27 X |
| 4,422,699 | 12/1983 | Sakurai et al. | 439/164 |
| 4,744,763 | 5/1988 | Suzuki et al. | 439/15 |
| 4,927,364 | 5/1990 | Inui et al. | 439/15 |
| 5,337,694 | 8/1994 | Nix et al. | 439/15 X |
| 5,450,769 | 9/1995 | Hu et al. | 439/15 X |
| 5,704,633 | 1/1998 | Durrani et al. | 280/728.2 |
| 5,762,508 | 6/1998 | Tanaka et al. | 439/164 |
| 5,766,019 | 6/1998 | Matsumoto et al. | 439/15 |
| 5,769,649 | 6/1998 | Welschholz et al. | 439/164 |
| 5,810,606 | 9/1998 | Ballast et al. | 439/15 |

*Primary Examiner*—Eric Culbreth
*Assistant Examiner*—F. Zeender
*Attorney, Agent, or Firm*—Pillsbury Madison & Sutro LLP

[57] ABSTRACT

A structure for connecting wires in a steering wheel. The steering wheel is mounted on a steering shaft to steer an automobile. The steering wheel includes a frame coupled to the steering shaft. The frame is manipulated to steer the automobile. An electric device is arranged in the steering wheel. A connector provides the electric device with electric power. The connector is manually inserted in the steering wheel during assembly. A mount holds the connector. A hole extends through the shaft frame near the mount. A guide is provided for guiding the connector toward the mount when inserting the connector through the hole. The guide is located between the shaft frame and the main frame. This results in more efficient assembly while limiting the number of parts.

26 Claims, 13 Drawing Sheets

STEERING WHEEL

BACKGROUND OF THE INVENTION

The present invention relates to steering wheels for automobiles.

There are automobile steering wheels that incorporate various devices to perform different functions. A steering wheel may include a horn switch for sounding a warning, an air bag device for protecting passengers during a collision, and a cruise control switch. Such devices are electrically connected to an electric power source of the automobile by connectors and wires that are accommodated in the steering wheel.

To reduce the number of assembling steps, each device is assembled before being installed in the steering wheel. The device assemblies are then connected to the frame of the steering wheel. Afterward, a cover is attached to the steering wheel frame. The steering wheel includes connectors that are connected to an electric power source when installing the steering wheel assembly in an automobile on an assembly line. Since the steering wheel frame is covered by the cover, the connecting of the connectors must be carried out within the cover. Thus, the connection of the connectors is burdensome. Furthermore, the connectors extending from the power source of the automobile must be manually guided to corresponding connectors in the steering wheel frame. Therefore, the installation of steering wheels in automobiles is inefficient.

SUMMARY OF THE INVENTION

Accordingly, it is an objective of the present invention to provide a steering wheel that facilitates the connection of connectors accommodated in steering wheels.

To achieve the above objective, the present invention provides a steering wheel mounted on a steering shaft to steer an automobile. The steering wheel includes a shaft frame coupled to the steering shaft. A main frame is coupled to the shaft frame. The main frame is manipulated to steer the automobile. An electric device is arranged in the steering wheel. A connector provides the electric device with electric power. The connector is manually inserted in the steering wheel. A mount holds the connector. A hole extends through the shaft frame near the mount. The connector is inserted through the hole. A guide guides the connector toward the mount when the connector is inserted through the hole. The guide is located between the shaft frame and the main frame.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a steering wheel according to a first embodiment of the present invention will now be described with reference to FIGS. 1 to 11.

Figure 1:
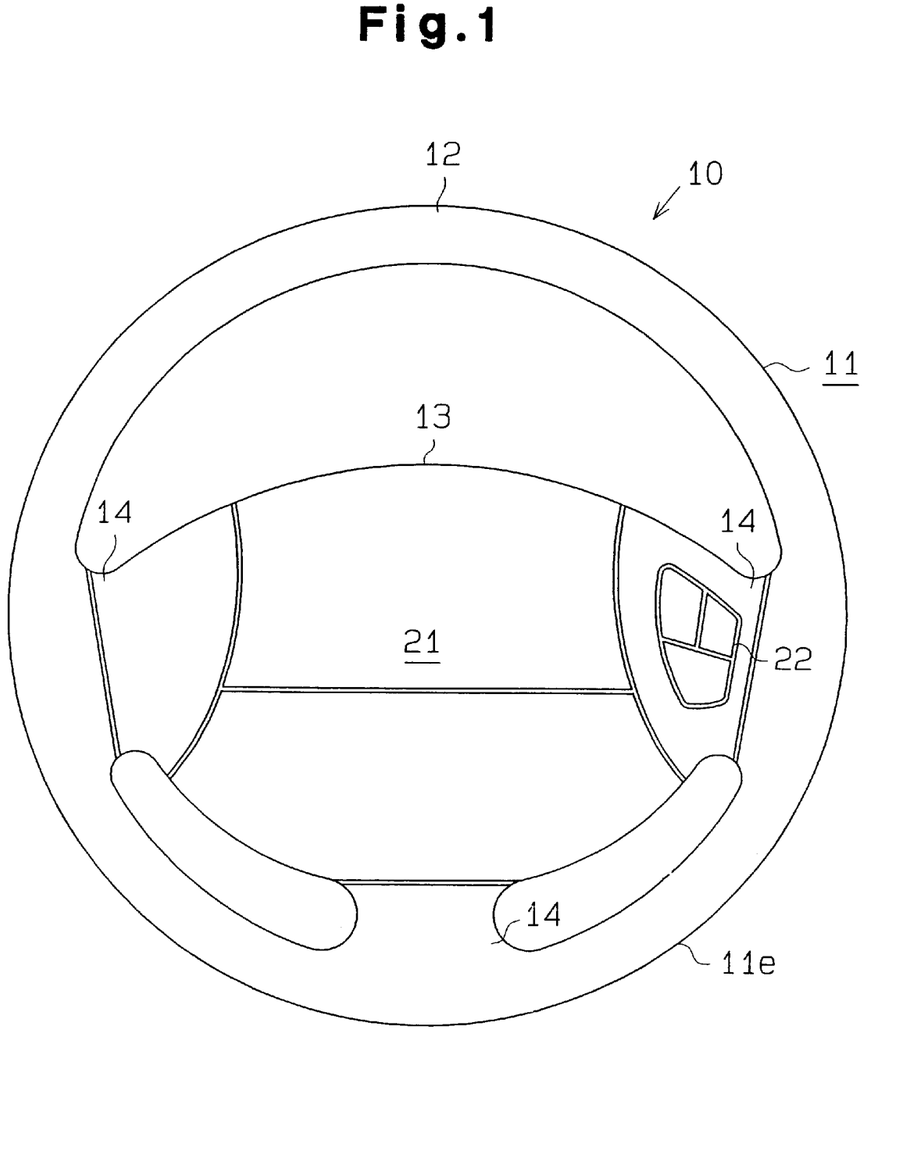
FIG. 1 is a front view showing a first embodiment of a steering wheel according to the present invention.

As shown in FIG. 1, a steering wheel 10 has a body 11, which includes an annular grip 12, a pad 13, and spokes 14 connecting the grip 12 to the pad 13. A horn switch 21 is arranged on the middle of the pad 13. A cruise control switch 22 is arranged on one side (the right side as viewed in FIG. 1) of the pad 13. The cruise control switch 22 actuates a device that drives the automobile at a constant speed.

Figure 2:
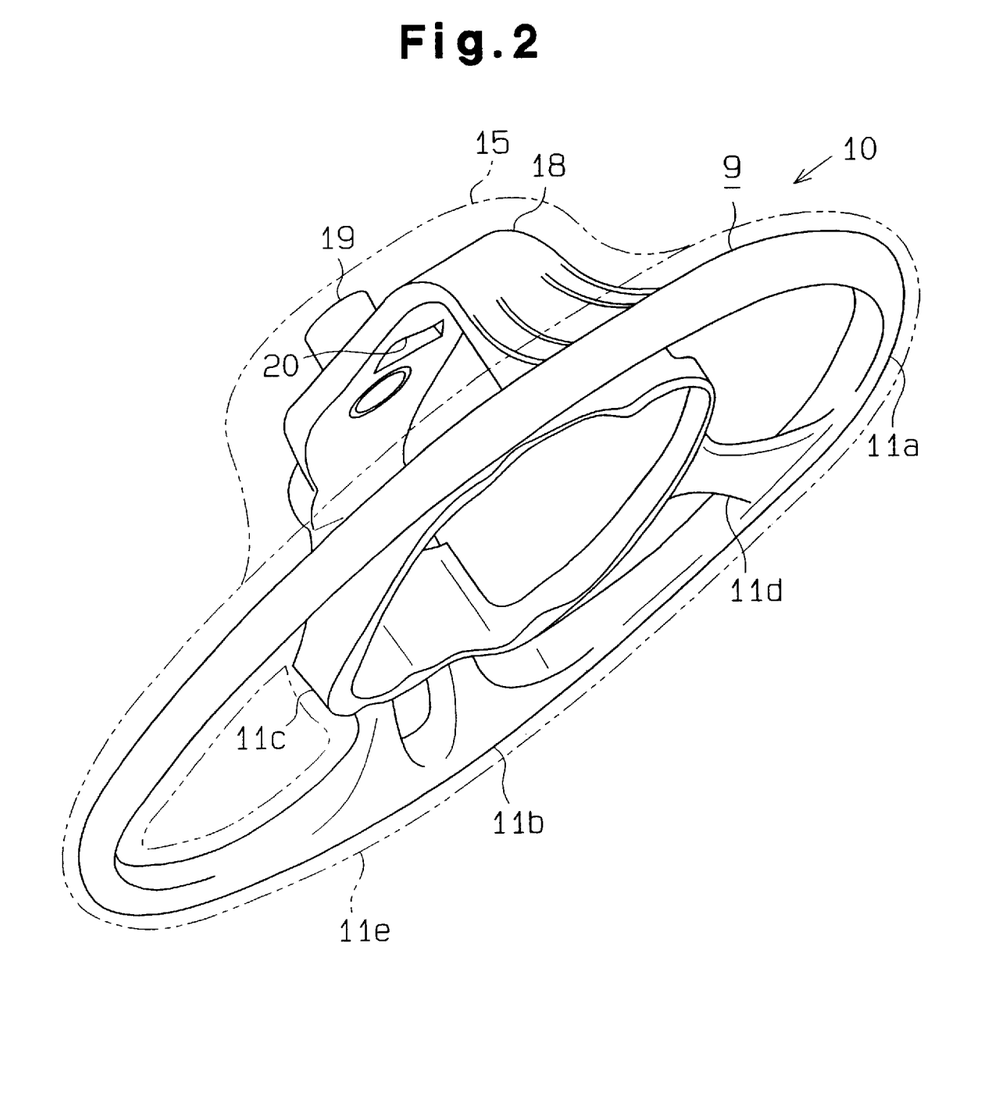
FIG. 2 is a perspective view showing the frame of the steering wheel of FIG. 1.

The steering wheel 10 has a frame 9, which is made of magnesium alloy. The frame 9 includes a main frame 11a and a shaft frame 18, which are formed integrally with each other. The main frame 11a is constituted by a grip frame 11b, a pad frame 11c, and spoke frames 11d. A soft synthetic resin material (such as polyurethane foam) 11e covers the grip frame 11b, the spoke frames 11d, and the upper surface of the pad frame 11c. A boss 19 is fixed to the shaft frame 18. The boss 19 couples the steering wheel 10 with a steering shaft (not shown). A hole 20 extends through the shaft frame 18 near the boss 19.

Figure 3:
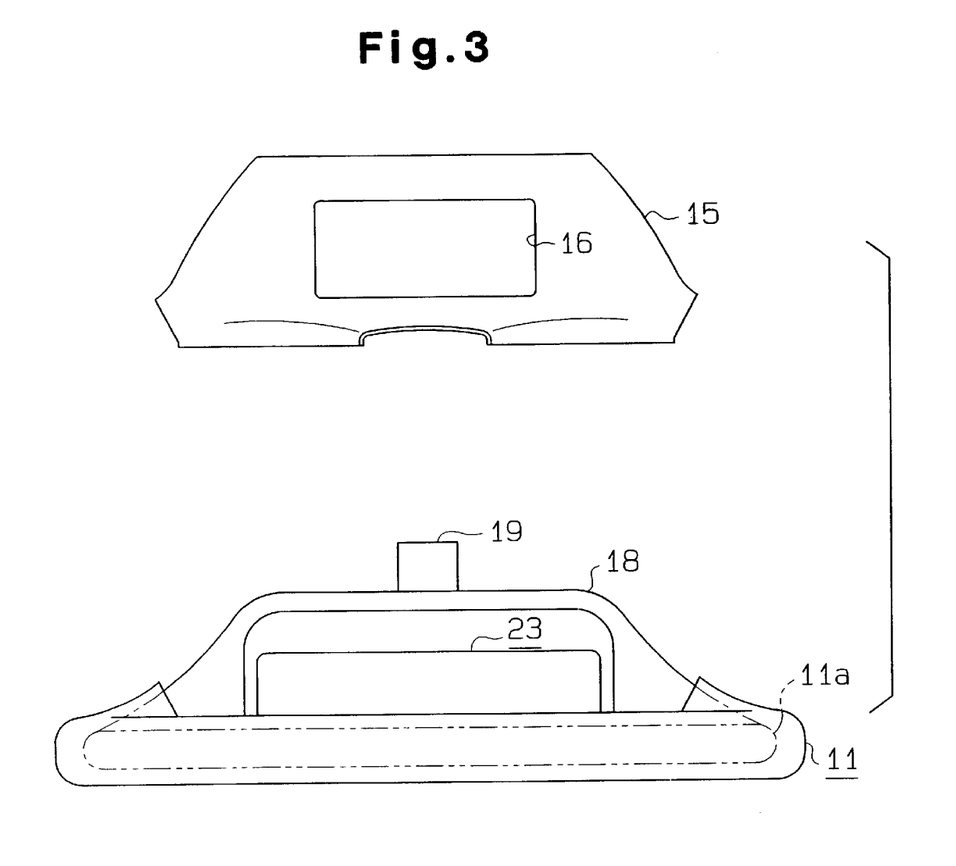
FIG. 3 is an exploded bottom plan view showing the steering wheel.
Figure 4:
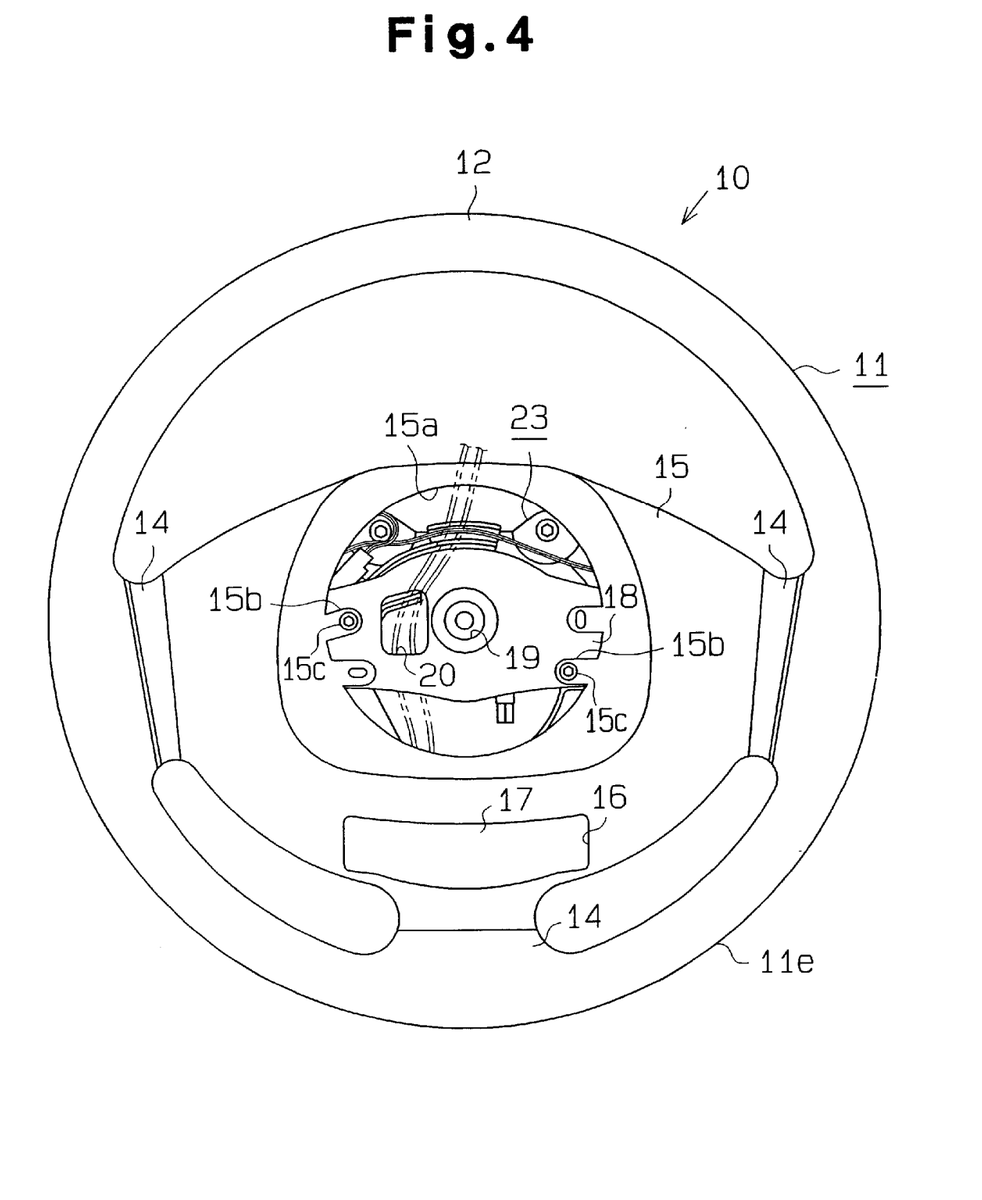
FIG. 4 is a rear view showing the steering wheel.

As shown in FIGS. 3 and 4, the shaft frame 18 is covered by a back cover 15. Fastening plates 15b extend from the back cover 15. Screws 15c are screwed into each fastening plate 15b to fasten the back cover 15 to the shaft frame 18. An opening 15a and a window 16 are defined in the back cover 15. The steering shaft is inserted into the back cover 15 through the opening 15a. The window 16 is provided to facilitate installation of the steering wheel 10 during assembly. After installing the steering wheel 10, the window 16 is closed by a cap 17.

Figure 5:
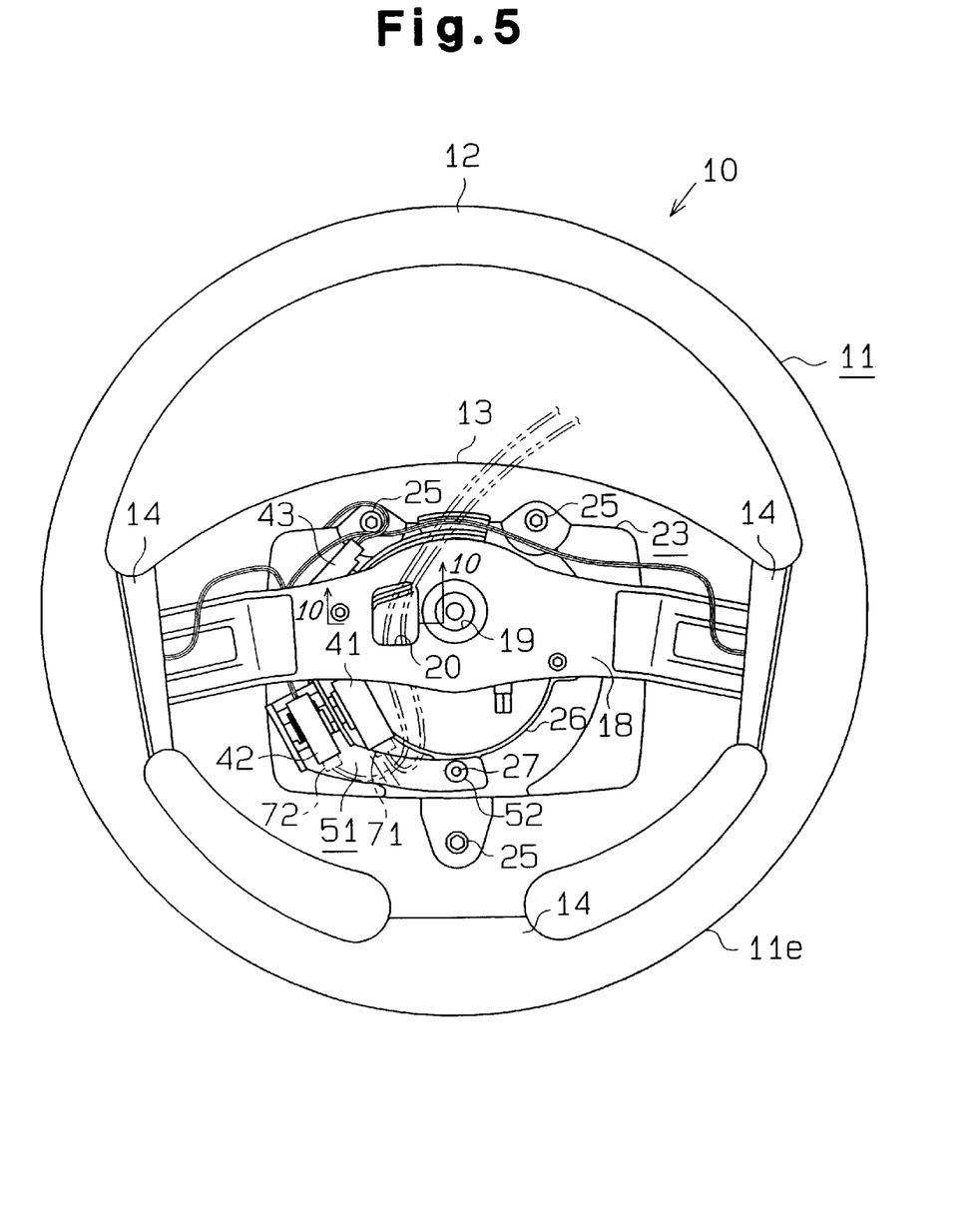
FIG. 5 is a rear view showing the steering wheel without the back cover.
Figure 10:
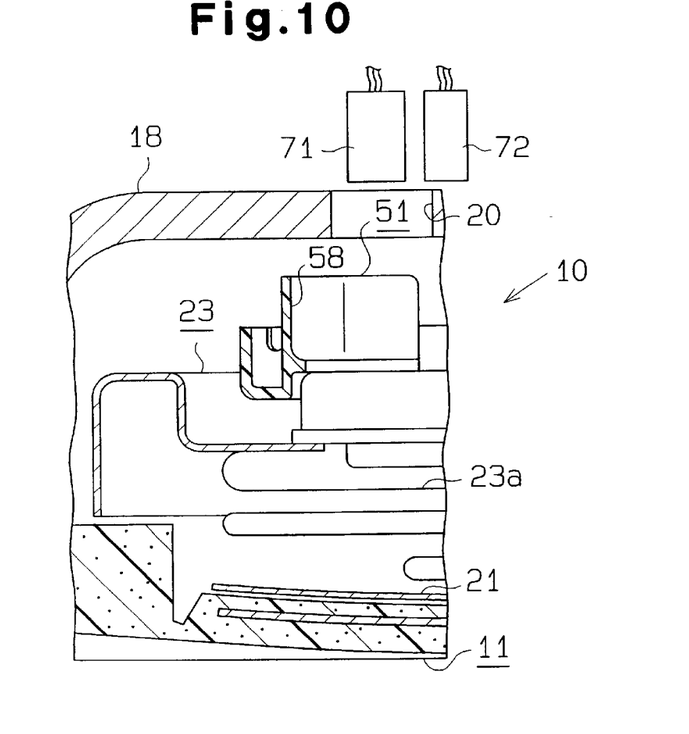
FIG. 10 is an enlarged partial cross-sectional view taken approximately along line 10—10 in FIG. 5.

An air bag device 23 is arranged in the space formed between the wheel body 11 and the shaft frame 18. As shown in FIG. 5, the air bag device 23 is fastened to the pad frame 11c by screws 25 (three in this embodiment). The air bag device 23 accommodates an inflator 26 and an air bag 23a, which is shown in FIG. 10. The inflator 26 has an ignitor that instantaneously burns a gas generating agent to produce nitrogen gas and inflate the air bag 23a. The inflator 26 is fastened to the air bag device 23 by nuts 28 and bolts 27 (four sets in this embodiment).

Figure 6:
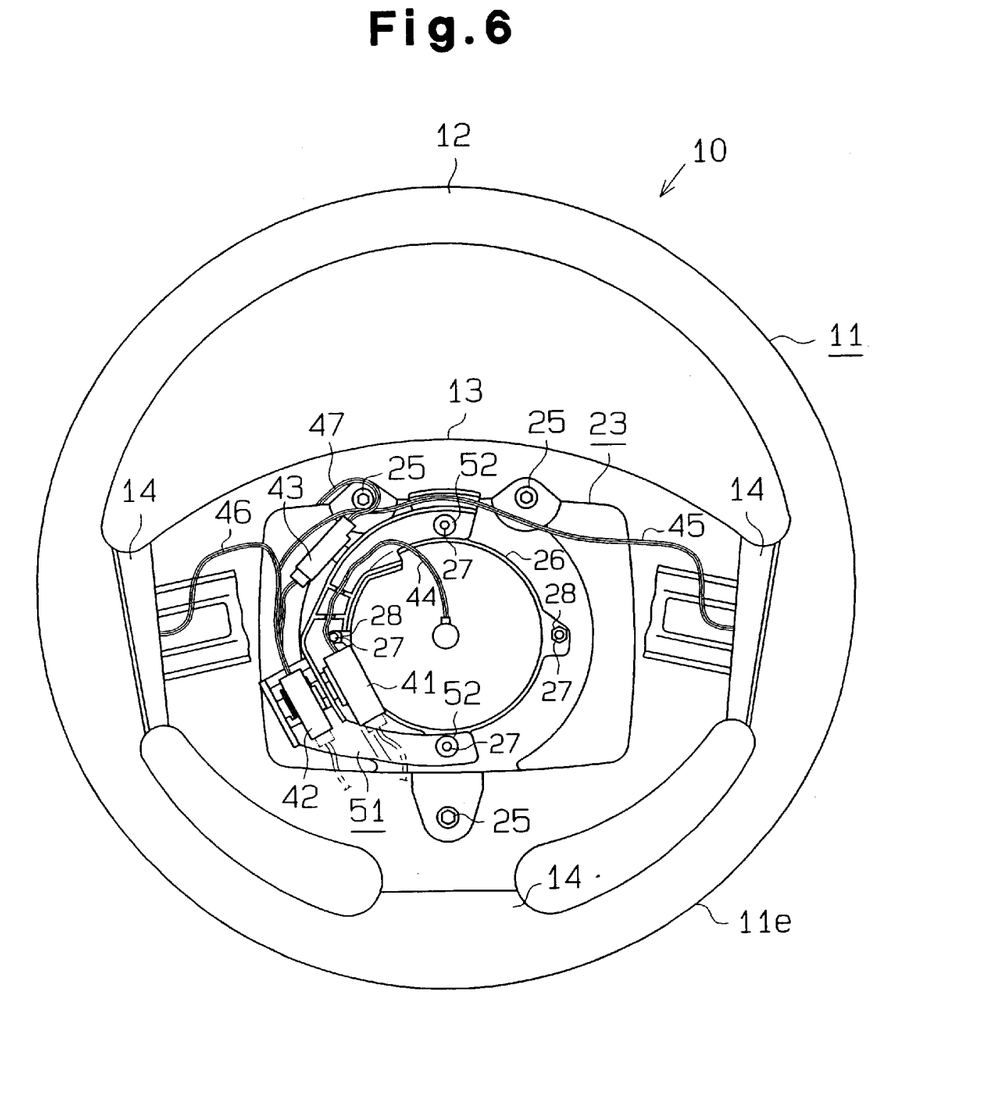
FIG. 6 is a broken rear view showing the shaft frame of FIG. 5.
Figure 7:
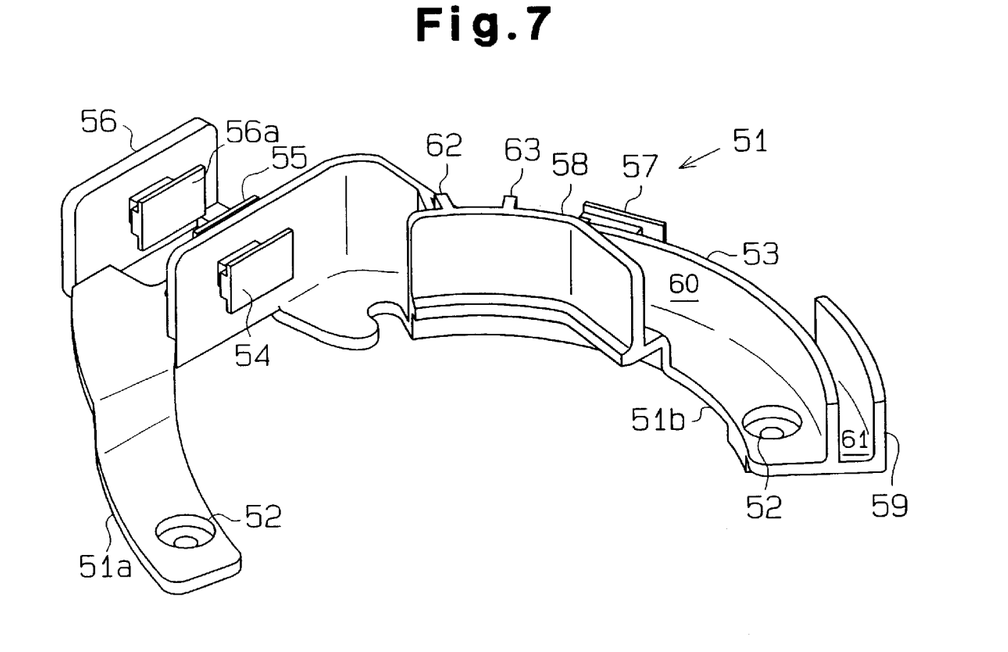
FIG. 7 is a perspective view showing a retainer employed in the steering wheel of FIG. 1.
Figure 11:
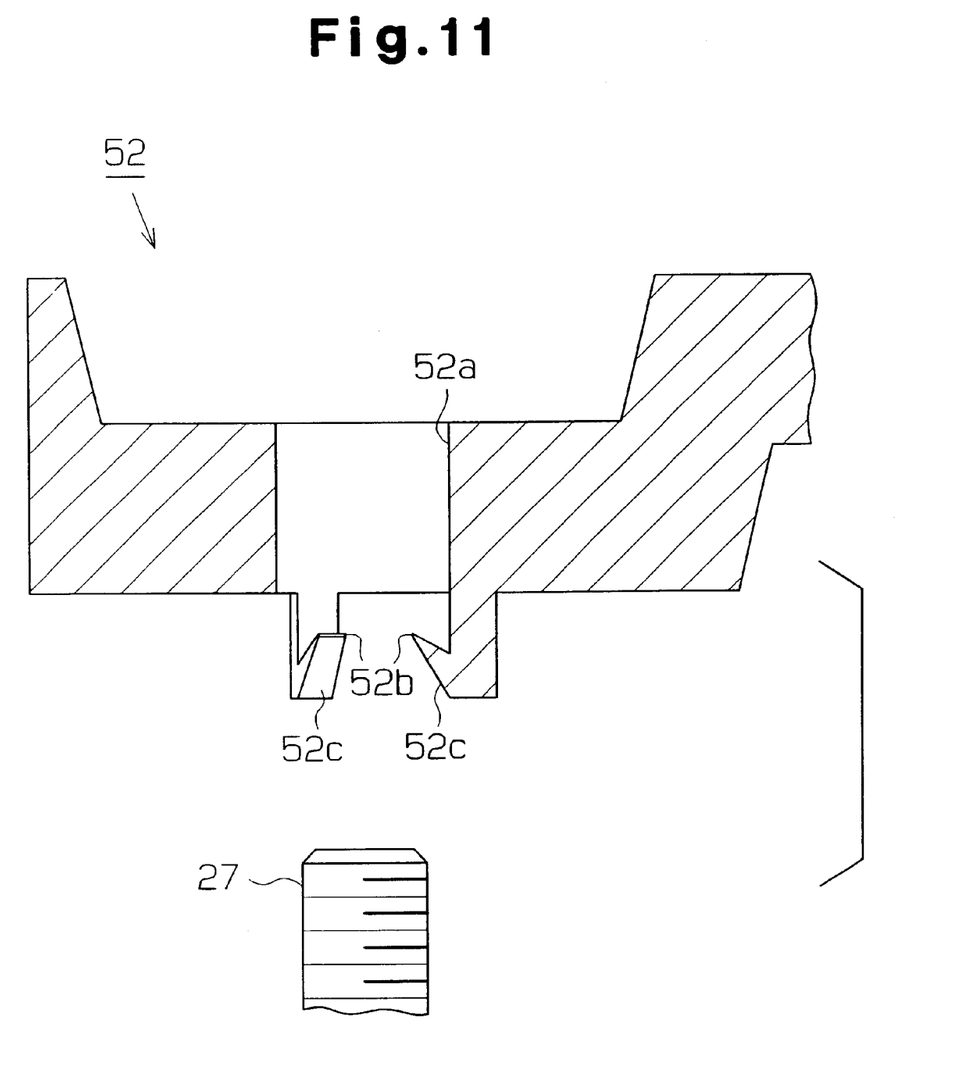
FIG. 11 is an enlarged partial cross-sectional view taken along line 11—11 in FIG. 8.

As shown in FIGS. 5 to 7, two of the bolts 27 are also employed to support a generally arcuate retainer 51 in the space formed between the main frame 11a and the shaft frame 18. As shown in FIG. 7, the retainer 51 has a first end 51a and a second end 51b. A coupling portion 52 is defined on each end 51a, 51b. As shown in FIG. 11, each coupling portion 52 has a bore 52a and hooks 52b. An oblique guide surface 52c is provided on each hook 52b. To install the retainer 51, each coupling portion 52 is pressed against the associated bolt 27. The bolt 27 is guided along the guide surface 52c separating the hooks 52b from one another. This causes the bolt 27 to enter into the bore 52a. When the bolt 27 is inserted into the bore 52a, the distal ends of the hooks 52b engage the threads of the bolt 27. This prevents the separation of the retainer 51.

As shown in FIG. 6, the inflator 26 of the air bag device 23 is connected to a connector 41 by a wire 44. The cruise control switch 22 is connected to a connector 42 by wires 45, 46. The horn switch 21 is also connected to the connector 42 by a wire 47 via an intermediate connector 43.

Figure 8:
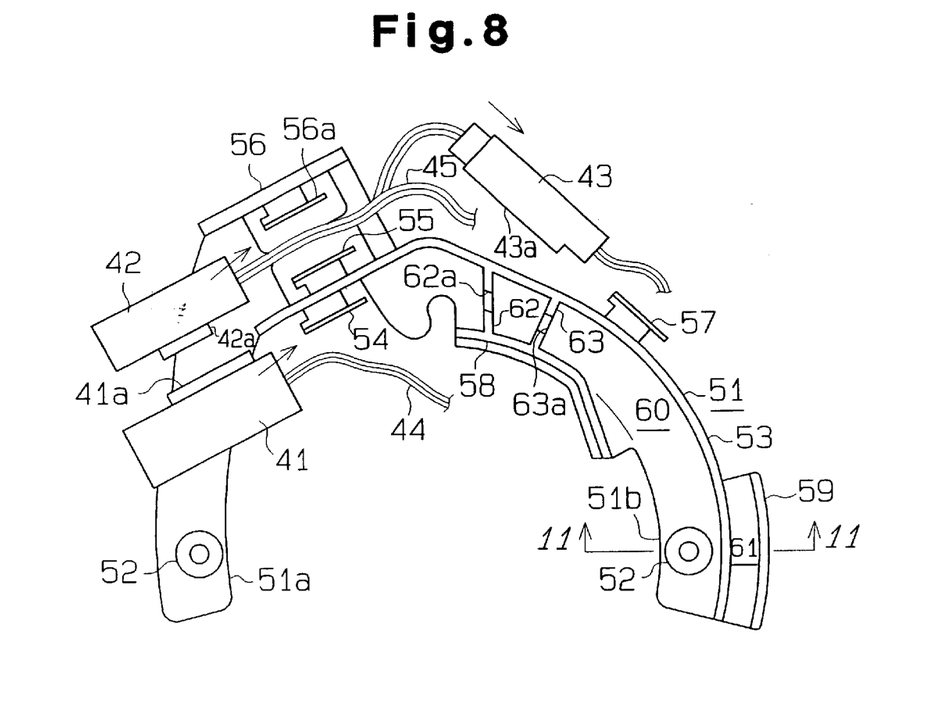
FIG. 8 is a plan view showing installation of a set of connectors of the retainer of FIG. 7.
Figure 9:
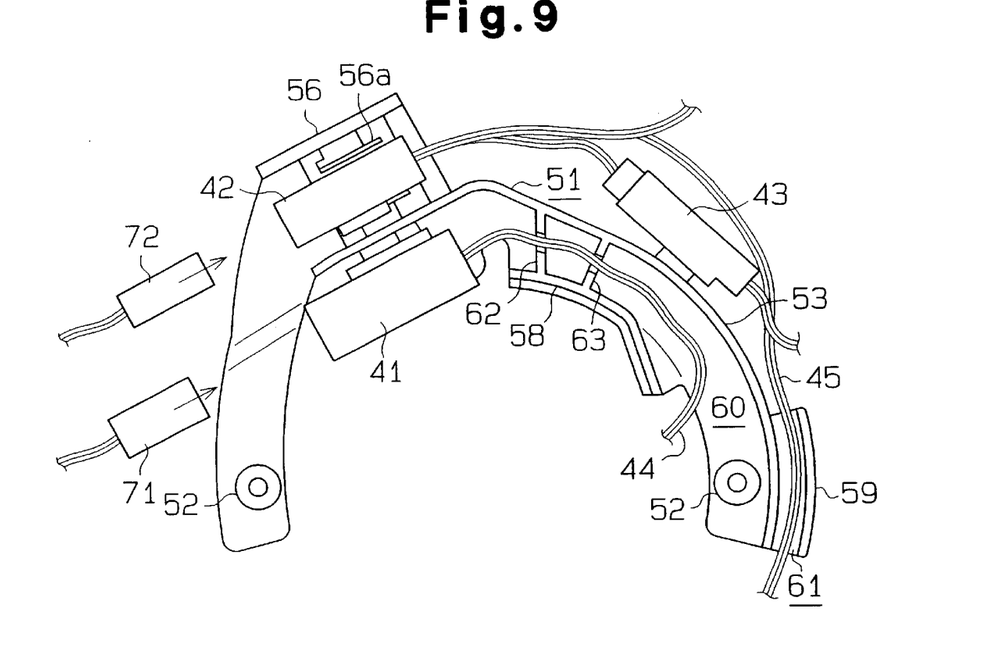
FIG. 9 is a plan view of the retainer of FIG. 8 showing mating of the connectors.

As shown in FIGS. 7 to 9, a partition wall 53 and outer walls 56, 59 are formed integrally with the retainer 51. The partition wall 53 extends along the second end 51b. The outer wall 56 extends along the outer side of the first end 51a. The outer wall 59 extends along the outer side of the partition wall 53 on the second end 51b. The space formed between the outer wall 59 and the partition wall 53 defines a holder 61 for holding the wire 45.

A bent guide wall 58 is also formed on the retainer 51 at the inner side of the middle of the partition wall 53 (lower side as viewed in FIG. 8). The space formed between the guide wall 58 and the partition wall 53 defines a holder 60. A bridging wall 62 having a groove 62a and a bridging wall 63 having a groove 63a extend between the partition wall 53 and the guide wall 58 to hold the wire 44 in the holder 60.

The retainer 51 includes mounts 54, 55, 57, 56a having T-shaped keys. The mount 54 is located on the inner side of the partition wall 53, while the mount 55 is located on the outer side of the partition wall 53. The mount 57 is located on the middle outer side of the partition 53. The mount 56a is located on the inner side of the outer wall 56. The connectors 41, 42, 43 have keyways 41a, 42a, 43a to engage the keys of the mounts 54, 55, 57, respectively. Accordingly, the retainer 51 retains the connectors 41, 42, 43. In the preferred and illustrated embodiment, the mount 56a is not used.

As shown in FIG. 9, connectors 71, 72 extending from the electric power source are connected to the connectors 41, 42, respectively. The connection between the connector 41 and the connector 71 electrically connects the ignitor (inflator 26) with the power source. The connection between the connector 42 and the connector 72 electrically connects the horn switch 21 and the cruise control switch 22 with the power source.

Before securing the back cover 15 to the steering wheel 10, the bolts 27 are inserted through the coupling portions 52 to support the retainer 51 at a position between the shaft frame 18 and the main frame 11. In this state, the connectors 41, 42, 43 are supported by the associated mounts 54, 55, 57. The back cover 15 is then attached to the steering wheel 10.

The steering wheel 10 is brought to the assembly line in the state shown in FIG. 4.

In the assembly line, the boss 19 of the steering wheel 10 is first engaged with the steering shaft. In this state, the connectors 71, 72 are inserted into the opening 15a and the hole 20 as indicated by the broken lines in FIG. 4. The connectors 71, 72 are guided along the guide wall 58 to a position near the connector 41. The person performing the assembly then inserts his or her fingers through the window 16 to mate the connectors 71, 72 with the associated connectors 41, 42. The steering wheel 10 is then securely coupled to the steering shaft after covering the window 16 with the cover 17.

The preferred and illustrated embodiment obtains the advantages described below.

(1) The connectors 71, 72 inserted through the opening 15a and the hole 20 are easily guided to the associated connectors 41, 42 by the guide wall 58. This facilitates the connection of the connectors 71, 72 with the connectors 41, 42. Accordingly, the steering wheel 10 is installed in the automobile more efficiently.

(2) The connectors 71, 72 are guided to the associated mounts 54, 56a by the guide wall 58, which has a simple structure. Furthermore, the guide wall 58 and the mounts 54, 55, 56a, 57 are formed integrally with the retainer 51. This reduces the number of components and thus decreases production costs.

(3) The wire 44 is held by the grooves 62a, 63a in the holder 60 defined between the partition wall 53 and the guide wall 58. The wire 45 is held in the holder 61 defined between the partition wall 53 and the outer wall 59. This structure prevents rattling of the wires that may be caused by vibrations of the automobile. Accordingly, noise that would otherwise be produced by rattling of the wires 44, 45 is prevented.

(4) The retainer 51 is fixed to the steering wheel 10 using the bolts 27 that fasten the inflator 26 of the air bag device 23. Accordingly, a separate fastener for fastening the retainer 51 to the steering wheel 10 is not necessary.

(5) The retainer 51 is arranged in the vicinity of the window 16. Furthermore, the connectors 41, 42 are arranged on the first end 51 of the retainer 51, which is located near the window 16. This structure facilitates the connection of the connectors 41, 42 to the associated connectors 71, 72.

It should be apparent to those skilled in the art that the present invention may be embodied in many other specific forms without departing from the spirit or scope of the invention. Particularly, it should be understood that the invention may be embodied in the following forms.

In the preferred and illustrated embodiment, the main frame 11a and the shaft frame 18 are made of magnesium alloy. However, the main frame 11a and the shaft frame 18 may be made of other materials such as aluminum alloy.

Although the grooves 62a, 63a of the associated bridging walls 62, 63 are preferred to prevent rattling of the wire 44, which is connected to the connector 41, the bridging walls 62, 63 and its grooves 62a, 63a are not required. Furthermore, the holders 60, 61 are provided to hold the wires 44, 45, which are connected to the associated connectors 41, 42. However, the holders 60, 61 are not required.

The mounts 54, 55, 56a, 57 and the guide wall 58 are formed integrally with the retainer 51. However, these parts may be formed separately from the retainer 51.

In the preferred and illustrated embodiment, the present invention is applied to a steering wheel 10 having a cruise control switch 22. However, in a further embodiment, the present invention may be applied to a steering wheel that does not have a cruise control switch 22.

Figure 12:
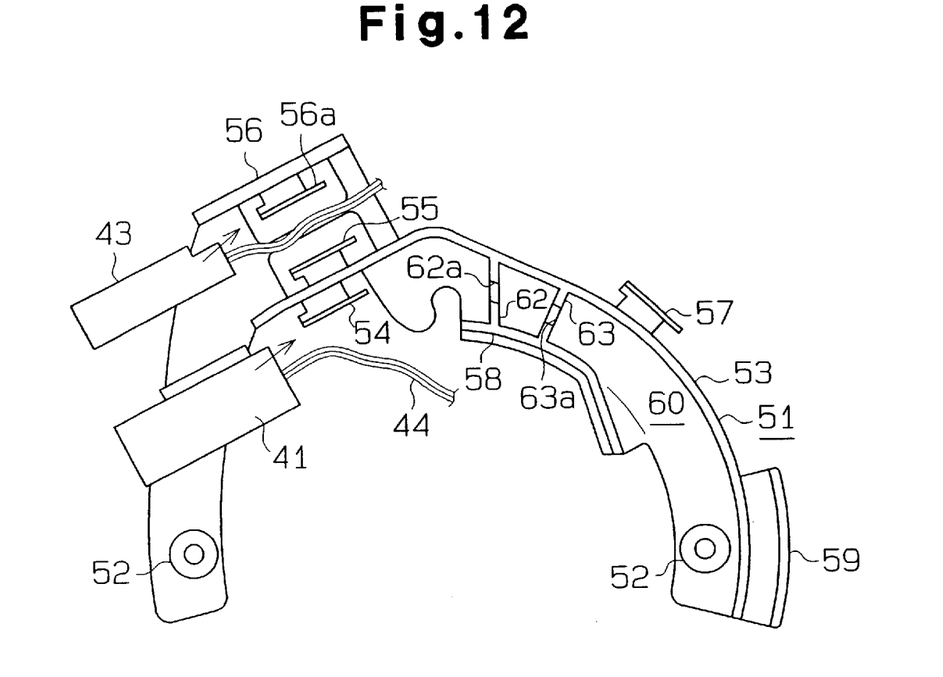
FIG. 12 is a plan view of a retainer employed in a steering wheel according to a further embodiment of the present invention showing installation of a set of connectors.
Figure 13:
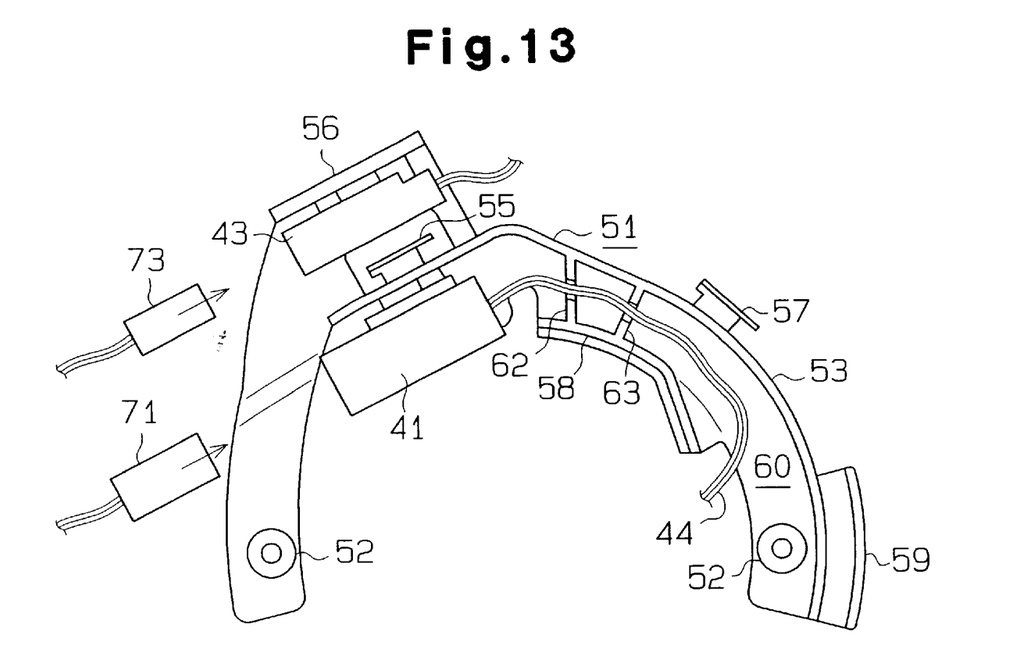
FIG. 13 is a plan view of the retainer of FIG. 12 showing mating of the connectors.
Figure 14:
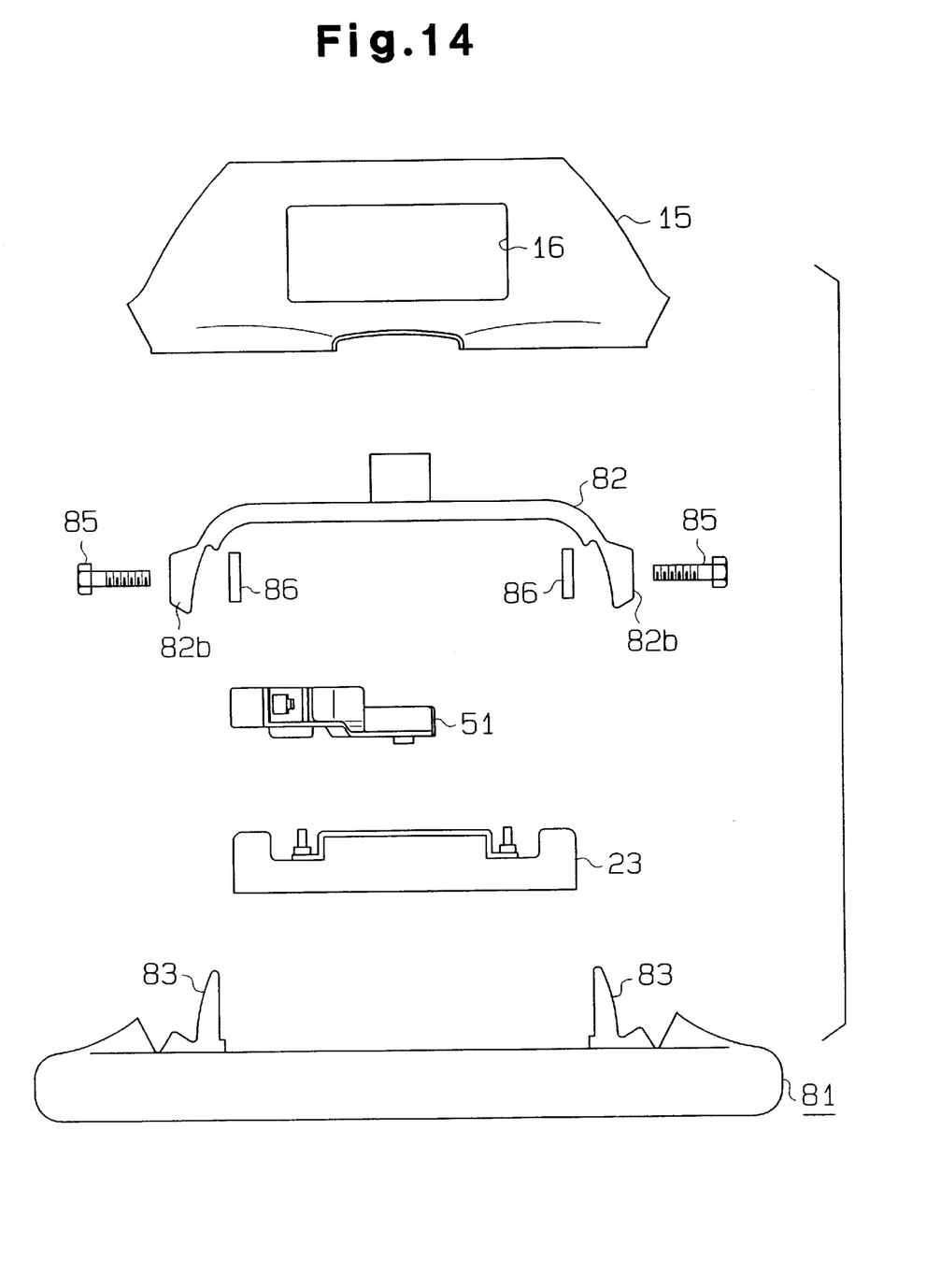
FIG. 14 is an exploded plan view showing a steering wheel according to a further embodiment of the present invention.
Figure 15:
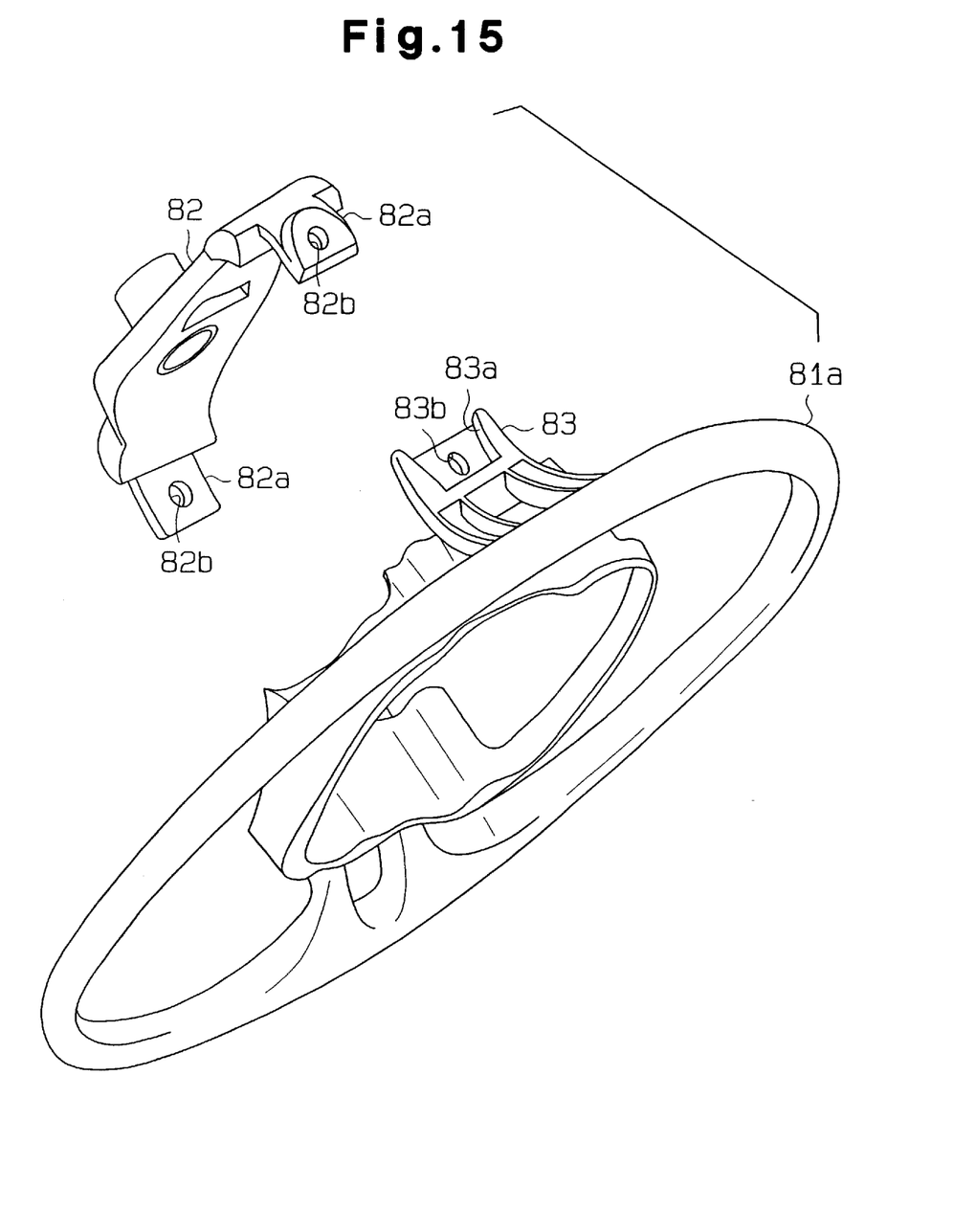
FIG. 15 is an exploded perspective view showing the frame of the steering wheel of FIG. 14.
Figure 16:
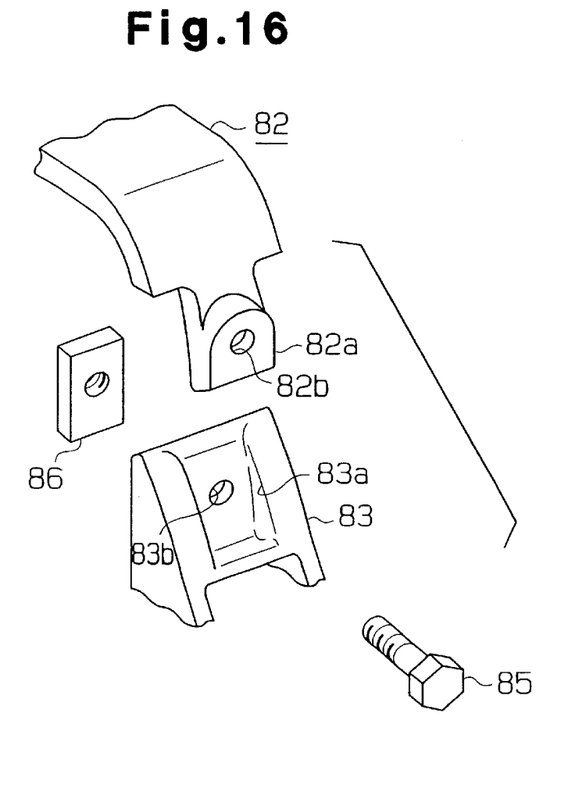
FIG. 16 is an exploded partial perspective view showing a frame joint of the steering wheel of FIG. 14.
Figure 17:
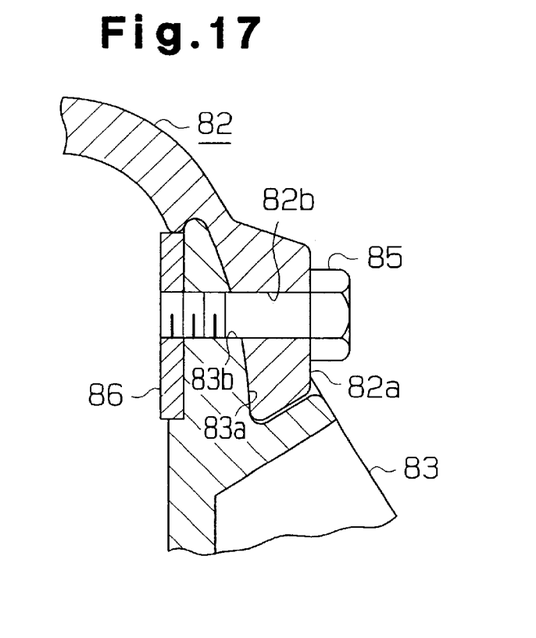
FIG. 17 is a cross-sectional view showing the frame joint of FIG. 16.

In such case, as shown in FIG. 12, the connector 42 becomes unnecessary. Thus, the intermediate connector 43 may be supported by the mount 56a instead of the mount 57 for mating with the connector 73, as shown in FIG. 13. The mounts 55, 57 are not used in this embodiment.

In the preferred and illustrated embodiment, the main frame 11a and the shaft frame 18 are formed integrally with each other. However, as shown in FIGS. 14 to 17, in a further embodiment according to the present invention, a steering wheel 81 may have a main frame 81a and a shaft frame 82 that are formed separately. The main frame 81a and the shaft frame 82 are made of magnesium alloy, aluminum alloy, or other materials.

In the embodiment of FIGS. 14 to 17, the main frame 81a and the shaft frame 82 are assembled together in the following manner. The main frame 81a includes joints 83. A recess 83a is defined in the outer surface of each joint 83. A hole 83b extends through the joint 83. The shaft frame 82 has a projection 82a formed on each of its ends. A hole 82b extends through the projection 82a. Each projection 82a is fitted into the associated recess 83a. A bolt 85 is inserted into each set of associated holes 82a, 83a and fastened to a square nut 86.

This structure secures the main frame 81a and the shaft frame 82 to each other in an integral manner. The following advantages are obtained by the embodiment of FIGS. 14 to 17.

The air bag device 23 may be assembled to the pad frame of the main frame 81a before connecting the main frame 81a and the shaft frame 82 to each other. Thus, the air bag device 23 may be secured without much spatial restrictions. This improves assembling efficiency.

Forces applied to the main frame 81a and the shaft frame 82 are received by the recesses 83a and the associated projections 82a. In other words, the bolts 85 need not receive the forces. Therefore, the bolts 85 need not be reinforced. For example, bushings do not have to be fitted into the holes 82b, 83b to reinforce the bolts 85. This reduces the number of components and decreases costs. However, if desired, bushings may be fitted into the holes 82b, 83b.

The rotating force applied to the steering wheel main frame 81a is transmitted to the shaft frame 82 at the portion where the projections 82a are engaged with the associated recesses 83a.

Therefore, the present examples and embodiments are to be considered as illustrative and not restrictive and the invention is not to be limited to the details given herein, but may be modified within the scope and equivalence of the appended claims.

What is claimed is:

1. A steering wheel mounted on a steering shaft to steer an automobile, wherein the steering wheel comprises:

a shaft frame coupled to the steering shaft;

a main frame coupled to the shaft frame, wherein the main frame is manipulated to steer the automobile;

an electric device arranged in the steering wheel;

an air bag device for protecting passengers during a collision;

a coupling member provided with the air bag device to couple the air bag device to the main frame;

a pad integrally formed with said main frame to cover the air bag device;

a connector assembly comprising a connector and a connector plug, providing electric power to the electric device;

a mount coupled to the main frame which holds the connector;

a hole extending through the shaft frame near the mount, wherein the connector plug is inserted through the hole; and a guide for guiding the connector plug toward the mount when the connector plug is inserted through the hole, wherein the guide is located between the steering shaft and the main frame.

2. The steering wheel according to claim 1 further comprising a cover for covering the shaft frame, the cover including an opening to permit insertion of the steering shaft and a window used by an installer for manipulating the connector plug after the connector plug has been inserted through the hole.

3. The steering wheel according to claim 1, wherein the guide includes a guide wall fixed to the main frame.

4. The steering wheel according to claim 3, wherein a retainer is fixed to the main frame, and wherein the mount and the guide wall are arranged on the retainer.

5. The steering wheel according to claim 4, wherein the retainer includes a holder for holding a wire connected to the connector.

6. The steering wheel according to claim 1, wherein the mount includes a key having a T-shaped cross-section.

7. The steering wheel according to claim 6, wherein the connector includes a keyway for engaging the key of the mount.

8. The steering wheel according to claim 1, wherein the coupling member includes male threads.

9. The steering wheel according to claim 1, wherein the connector has a wire for providing electric power, and wherein the retainer includes a holder for holding the wire.

10. The steering wheel according to claim 4, wherein the retainer includes:

a bore for permitting the insertion of the coupling member, the bore being defined by a bore wall;

flexible hooks projecting from the bore wall toward the center of the bore; and an inclined guide surface defined on each hook to guide the coupling member into the bore, wherein insertion of the coupling member engages the coupling member with the guide surfaces thus separating the hooks from one another and then engages the hook with the outer surface of the coupling member.

11. The steering wheel according to claim 9, wherein the holder includes:

opposed walls formed on the retainer;

a bridging wall bridging the opposed walls; and a groove for supporting the wire.

12. A steering wheel for an automobile comprising:

a frame;

a cover formed on a rear side of the steering wheel;

a wire, having a first electrical connector, inserted into the steering wheel during installation of the steering wheel in the automobile;

an electrical component mounted inside the steering wheel, wherein the electrical component is powered by electricity from the wire;

an air bag device for protecting passengers during a collision;

a coupling member provided with the air bag device to couple the air bag device to the frame;

a pad integrally formed with said frame to cover said air bag device;

a coupler located on the frame for engaging a steering shaft;

a retainer fixed to the frame for holding a second electrical connector, wherein the second electrical connector is connected to the electrical component, and wherein the second electrical connector is mated to the first electrical connector during the installation of the steering wheel in said automobile;

a wire guide surface formed on the retainer for guiding the wire; and a generally lateral opening formed in the cover for permitting manipulation of the wire.

13. The steering wheel according to claim 12, wherein the frame includes a hole through which the wire is inserted during the installation, wherein the wire is passed from the hole toward the guide surface and toward the second electrical connector.

14. The steering wheel according to claim 13, wherein the guide surface is integrally formed with the retainer, and the retainer further includes an integrally formed mount for receiving the second electrical connector.

15. A steering wheel for an automobile comprising:

a frame;

a cover formed on a rear side of the steering wheel;

a wire, having a first electrical connector, inserted into the steering wheel during installation of the steering wheel in the automobile;

an electrical component mounted to the frame inside the steering wheel, wherein the electrical component is powered by electricity from the wire;

an air bag device for protecting passengers during a collision;

a coupling member provided with the air bag device to couple the air bag device to the frame;

a pad integrally formed with the frame to cover the air bag device;

a coupler located on the frame for engaging a steering shaft;

a retainer fastened to the frame for holding a second electrical connector, which is electrically connected to the electric component, wherein one side of the retainer faces an inside surface of the cover, and wherein the second electrical connector is mated to the first electrical connector during the installation of the steering wheel in the automobile; and a generally lateral opening formed in the cover for permitting manipulation of the wire during installation.

16. The steering wheel according to claim 15, wherein the retainer includes an integrally formed guide surface for guiding the wire toward the second electrical connector during the installation.

17. The steering wheel according to claim 16, wherein the frame includes a hole for receiving the wire during the installation, wherein the wire is first passed through the hole and is then passed by the guide surface toward the second electrical connector.

18. The steering wheel according to claim 16, wherein the retainer includes an integrally formed wire holder for securing a second wire leading from the second electrical connector.

19. The steering wheel according to claim 16, wherein the retainer is generally arcuate and extends about the axis of the steering wheel.

20. A steering wheel mounted on a steering shaft to steer an automobile, wherein the steering wheel comprises:

a shaft frame coupled to the steering shaft;

a main frame coupled to the shaft frame, wherein the main frame is manipulated to steer the automobile;

an electric device arranged in the steering wheel;

a connector assembly comprising a connector and a connector plug, providing the electric device with electric power;

a mount coupled to the main frame which holds the connector assembly;

a hole extending through the shaft frame near the mount, wherein the connector is inserted through the hole;

a guide for guiding the connector plug toward the mount when the connector plug is inserted through the hole, wherein the guide is located between the shaft frame and the main frame, and the guide includes a guide wall fixed to the main frame;

an air bag device for protecting passengers during a collision;

a coupling member provided on the air bag device to couple the air bag device to the main frame; and a retainer fixed to the main frame, wherein the mount and the guide wall are arranged on the retainer, the retainer including:

a bore for permitting the insertion of the coupling member, the bore being defined by a bore wall;

flexible hooks projecting from the bore wall toward the center of the bore; and an inclined guide surface defined on each hook to guide the coupling member into the bore, wherein insertion of the coupling member engages the coupling member with the guide surfaces thus separating the hooks from one another and causing engagement of each hook with the outer surface of the coupling member.

21. The steering wheel according to claim 20 further comprising a cover for covering the shaft frame, the cover including an opening to permit insertion of the steering shaft and a window used by an installer for manipulating the connector plug after the connector plug has been inserted through the hole.

22. The steering wheel according to claim 20, wherein the retainer includes a holder for holding a wire connected to the connector.

23. The steering wheel according to claim 20, wherein the mount includes a key having a T-shaped cross-section.

24. The steering wheel according to claim 23, wherein the connector includes a keyway for engaging the key of the mount.

25. The steering wheel according to claim 20, wherein the coupling member includes male threads.

26. The steering wheel according to claim 20, wherein the connector has a wire for providing electric power, and wherein the retainer includes a holder for holding the wire.

* * * * *